March 17, 1931.  J. L. OSGOOD  1,796,663
MILLING MACHINE
Filed April 7, 1927  3 Sheets-Sheet 3
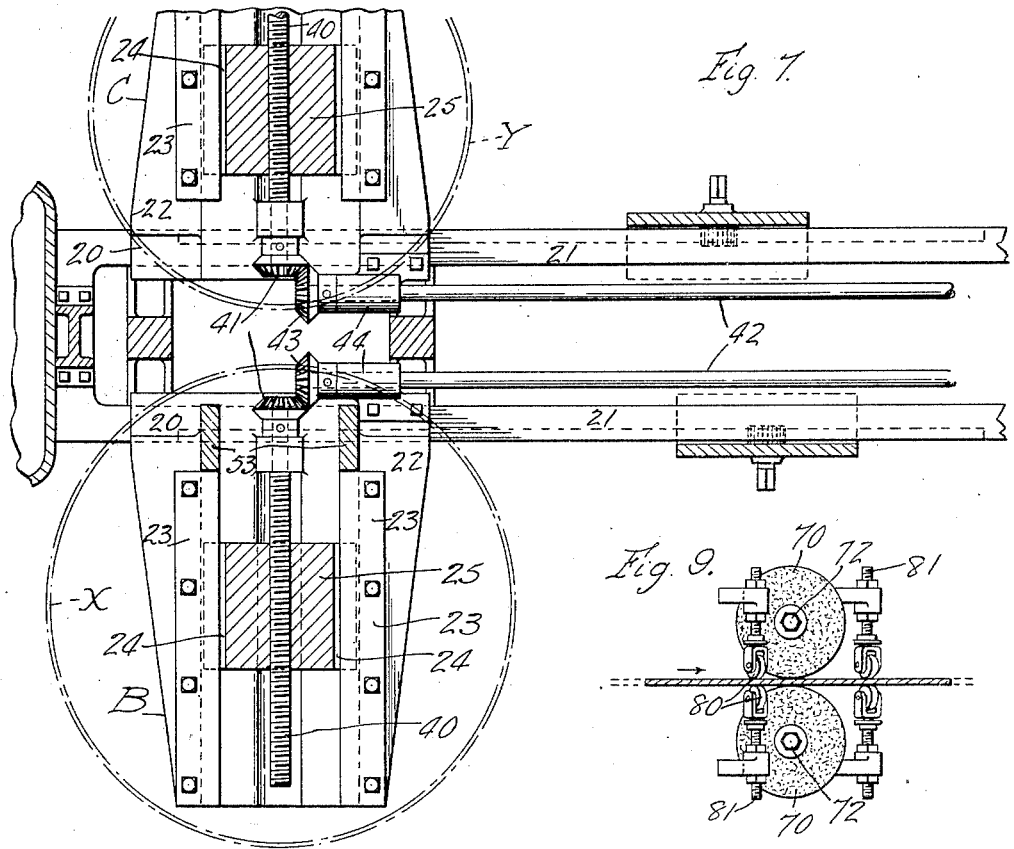
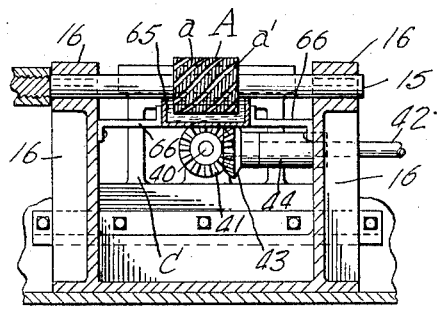
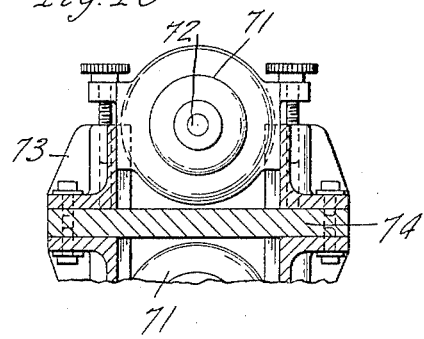
INVENTOR.
John L. Osgood
by Parker & Prochnow
ATTORNEYS.

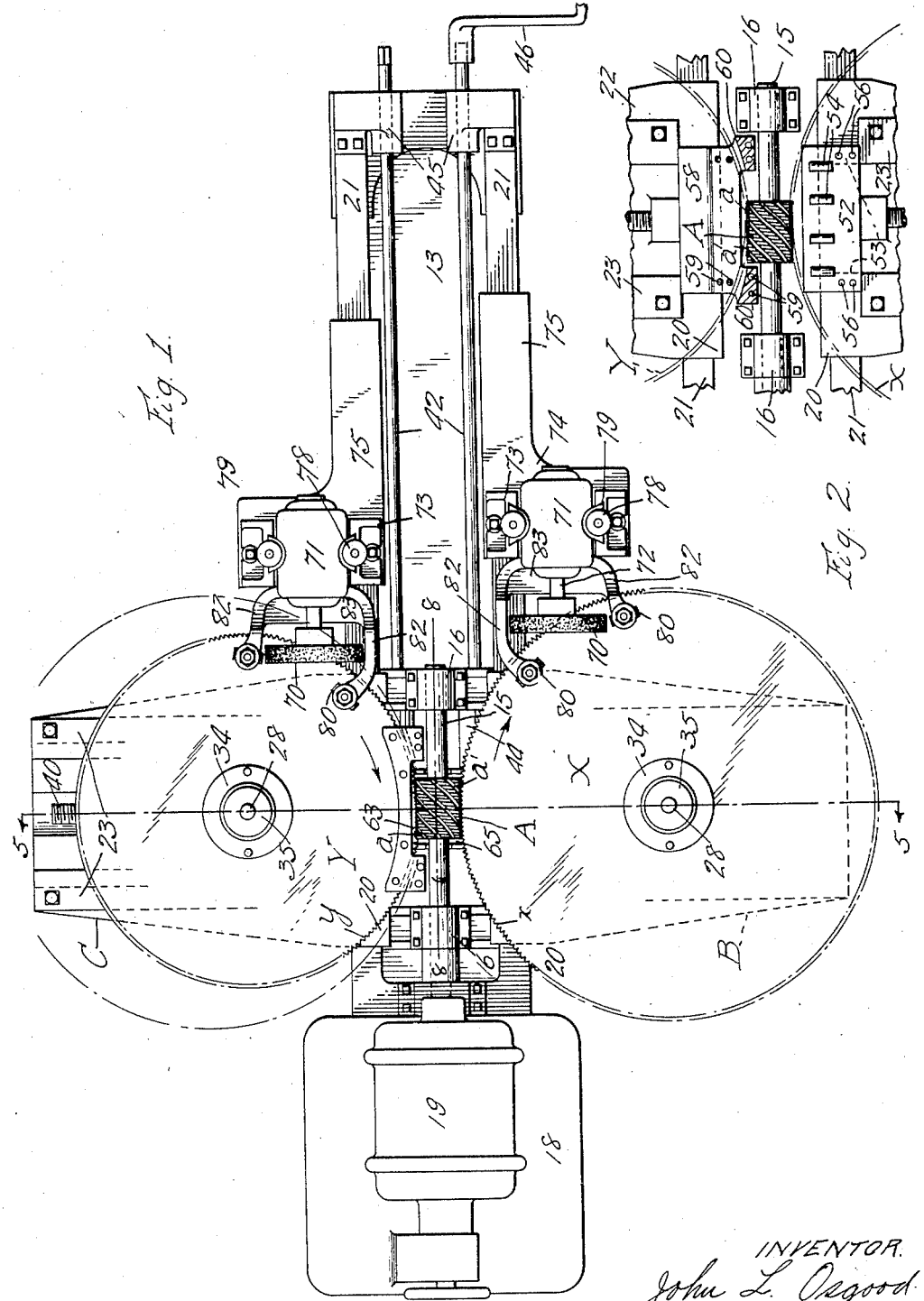

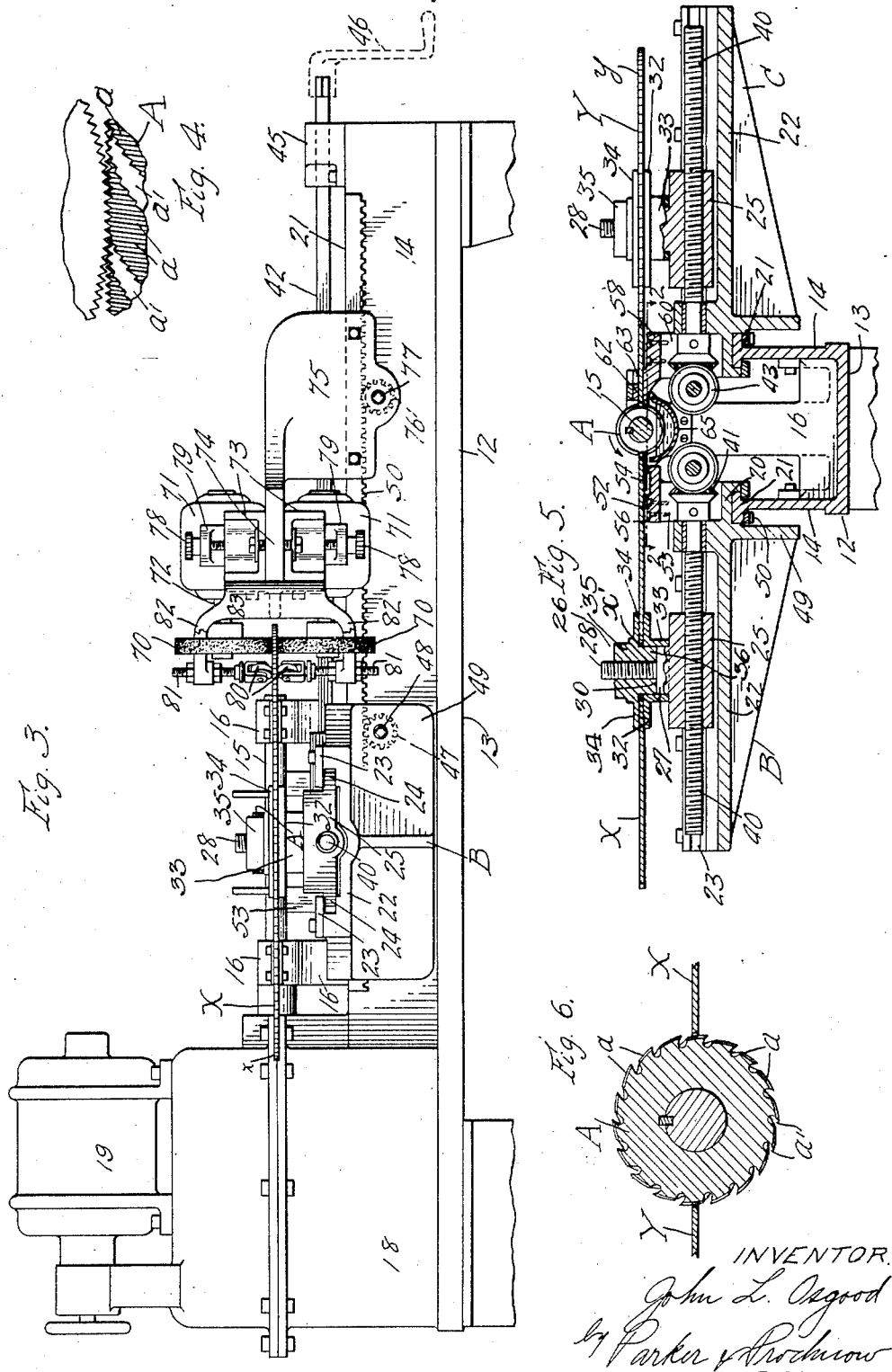

Patented Mar. 17, 1931

1,796,663

UNITED STATES PATENT OFFICE

JOHN L. OSGOOD, OF BUFFALO, NEW YORK

MILLING MACHINE

Application filed April 7, 1927. Serial No. 181,829.

This invention relates to improvements in machines for forming, cutting or sharpening and grinding the teeth or cutting edges of rotary cutting disks or saws, and for milling and grinding teeth, grooves or the like in other members.

In steel mills or other plants where steel shapes, bars, rails and the like are manufactured or handled, it is now customary to cut the shapes of bars by means of large steel disks provided with toothed edges. In order to increase the speed of cutting, these disks are rotated at high speed, and presented to the work under great pressure. The teeth on such disks are usually left unset, and act to tear and melt away the metal at the cut, as distinguished from clean cuts made by sharp-edged tools. The teeth of the disks or saws are cooled by reason of their high speed of travel through the air, and therefore do not wear away as rapidly as might be supposed. Unless the teeth are sufficiently sharp and free from burrs or rough side edges, the disks will not operate as efficiently and will produce rough or uneven cuts in the work. Therefore, in order to meet the demand of the trade that the bars or shapes must have true, smooth ends or faces without rough edges, it is customary to sharpen or recut the teeth of the disks and remove the burrs or rough side edges of the teeth from time to time. According to the methods heretofore employed this is a slow, laborious and expensive operation.

The machine of the present invention is particularly adapted for milling and grinding or dressing such cutting disks or tools.

One object of the invention, therefore, is to construct a simple, efficient and improved milling machine for the purpose stated; also to provide a machine of this kind on which more than one disk, of the same or different sizes, can be mounted so that their edges can be simultaneously presented to the forming tool or milling cutter.

Another object is to provide a milling machine in which means are provided for grinding or dressing the faces of the teeth of other desired portions of the disks for removing burrs formed thereon simultaneously with or during the operation of said forming or milling tool upon other portions of the disks.

Other objects are to construct a machine of this character in which the grinding or dressing means are adjustably mounted so as to be moved to operative position for acting on work of different sizes or character; also to provide novel guide means for guiding the work into and out of operative relation to the grinding or dressing means.

Further objects are to provide a milling machine in which a disk or disks can be mounted to rotate relatively to and past the milling cutter or forming tool, and having novel means for supporting the peripheral or edge portions of the disks as they move into and out of operative relation to said cutter; and also to improve the construction of milling machines in the other respects hereinafter set forth and claimed.

In the accompanying drawings.

Fig. 1 is a plan view of a machine embodying my invention for milling or cutting and for grinding or dressing the edges or peripheral toothed portions of cutting disks or other tools.

Fig. 2 is a fragmentary, horizontal section thereof, approximately on line 2—2, Fig. 5, showing the parts in different positions from that shown in Fig. 1.

Fig. 3 is a side elevation of the machine.

Fig. 4 is a fragmentary detail view, on an enlarged scale, showing the relation of the milling cutter or forming tool to the work.

Fig. 5 is a transverse, vertical section of the machine, on line 5—5, Fig. 1.

Fig. 6 is a vertical transverse section of the milling cutter or forming tool, in operative relation to portions of two cutting disks, for cutting teeth on the edges of the latter.

Fig. 7 is a fragmentary, sectional plan view of the adjustable transverse carriages for supporting the work and presenting the same to the milling cutter.

Fig. 8 is a fragmentary, longitudinal vertical section on line 8—8, Fig. 1.

Fig. 9 is a face view of one pair of grinding wheels or elements, and the novel guide means for guiding and holding the work in operative relation thereto.

Fig. 10 is a fragmentary, sectional elevation, showing the means for adjusting the driving motors for the grinding wheels, whereby the latter can be adjusted relatively to the work.

In the illustrated embodiment of the invention, there is disclosed a forming or milling machine for the purpose stated, having a suitable frame including a bed plate or member 12, and spaced, upright, parallel side flanges or walls 14. Extending lengthwise of the bed plate 12 is a horizontal shaft or spindle 15 journalled for rotation in a pair of spaced bearing brackets or supports 16 suitably secured to said bed plate 12 between the flanges 14. The shaft 15 has fixed thereto, between the brackets 16, a suitable milling cutter or forming tool A. The shaft 15 can be driven in any suitable manner, as by a variable speed or transmission mechanism (not shown) located in a casing 18 mounted at one end of the bed plate, and which is operatively connected to a motor 19 arranged on the top of said casing.

In order to obtain the maximum efficiency, the machine is preferably so organized that two disks or blanks or other pieces of work can be arranged at opposite sides of the cutter A so that both can be operated upon simultaneously.

Two of the steel cutting disks before mentioned are shown at X and Y respectively. The cutting edges or portions of the respective disks are represented by the V-shaped peripheral teeth $x$ and $y$, and each disk is also provided with the usual central hole $x'$ for the reception of the shaft on which the disk is mounted when being used for cutting. Each disk is mounted to turn about its axis relatively to the cutter A preferably in a horizontal plane passing through the axis of the cutter, and for this purpose is removably secured on an arbor carried by a feed carriage supported on and movable lengthwise of the bed plate 12, and which is provided with transverse feed means for moving the disk towards and from the cutter A. These carriages are designated respectively B and C, and each comprises a guide portion 20 slidably embracing a horizontal track 21, one of which is formed at the top edge of each of the flanges 14. Extending laterally from the slide 20 is a horizontal bracket 22 provided with a pair of parallel guideways or channels 23 into which the guide ribs 24 of a transversely movable cross slide 25 extends.

This slide 25, see Fig. 5, is provided with a fixed vertical arbor 26 including an annular boss 27 formed on the top face of said slide and from the center of which projects a vertical, threaded stud or post 28. Between said boss 27 and stud 28 there is a horizontal shoulder or face 30. The disk or other member supported by the slide is preferably secured thereon so as to turn freely on said arbor while being prevented from vertical movement. For this purpose, the disk is arranged with the portion adjacent the hole $x'$ resting on the horizontal top face of an annular flange 32 of a supporting member or sleeve 33, which is centered on or embraces the boss 27. The disk X or Y is confined or held in operative relation to the flange 32, see Fig. 5, by a corresponding opposed flange 34 formed on or secured to a clamping nut 35 screwed on the stud 28, and which is provided with a depending centering portion 36 which extends through the hole $x$ and fits into the sleeve 33 and bears against the shoulder 30. The length of the portion 36 is such that when engaging said shoulder there is just sufficient clearance between the flanges 32 and 34 to permit free rotation of the disk without any appreciable vertical movement.

In order to accommodate disks, saws or the like of different thicknesses and to enable them to be disposed with their horizontal center planes in line with the axis of the cutter A, supporting members 33 and clamping nuts 35 of different lengths can be provided.

The milling cutter A is preferably of a construction such that it will advance or rotate the work presented thereto, being formed with a plurality of cutting teeth $a$ arranged in the form of a helix and intersected by a plurality of spiral grooves $a'$ whereby the rotation of the cutter will lead or advance the disks during the forming or milling operation. Consequently by mounting the disks X and Y so as to rotate freely about the axes of their respective arbors, both disks will be turned by the cutter A at the same peripheral speed whether the disks are of the same, or different diameters.

To enable disks X and Y of different sizes to be positioned in operative relation to the cutter A and be advanced towards the latter at will, as the work progresses, suitable means are provided for shifting the slides 25 transversely in their guideways 23. Such means, see Fig. 7, comprises a pair of transverse, horizontal feed screws 40 suitably journalled and held from endwise movement on the carriages B and C and each of which extends through and has threaded engagement in one slide, and has at its inner end a bevel pinion 41. A pair of parallel operating shafts 42 extending lengthwise of the machine and provided at their inner ends with bevel pinions 43 meshing with the pinions 41, are used for rotating the screws 40. The shafts 42 are preferably arranged in a manner to shift lengthwise with the carriages B and C, while being prevented from endwise movement relatively thereto. For this purpose, each shaft is journalled at its inner end in a bearing 44 fixed on the corresponding carriage B or C and against which the hub of the adjacent pinion 43 abuts, while the outer ends of said shafts slidably engage in guide sleeves or brackets 45 fixed on the bed plate. The shafts 42 are independently rotable, their outer ends being squared or otherwise fashioned for the reception of a suitable crank 46, whereby the cross slides 25 can be individually adjusted and the work advanced to the cutter A from time to time as the milling operation proceeds.

The carriages B and C, as stated, are slidably mounted on the tracks 21 of the bed plate so that they may be given a limited longitudinal movement for presenting the disks or other work to different portions of the milling cutter A, so that full use of the entire cutting surface thereof may be had. Any suitable means may be employed for this purpose such as pinions 47 fixed on short transverse shafts 48 journalled in depending webs 49 of the carriages and meshing with racks 50 secured to the underside of the corresponding tracks 21. The shaft 48 of each carriage projects outwardly through said web 49 thereof and is formed for engagement by the operating crank 46 or other device to rotate the pinion.

Assuming that the milling cutter A is rotating in the direction of the arrow, Figs. 1 and 5, it will be evident that the cutter will pass crosswise of the edge of the disk or other member X on the carriage B in a downward direction and in an upward direction relatively to the other member Y on the carriage C. Means are therefore provided for preventing vibration or chattering of the disks X and Y while being operated upon by the cutter and for properly guiding and holding the successive peripheral portions of these disks as they move into and out of operative relation to the cutter A, see Figs. 2 and 5.

The means shown for supporting the disk X in this manner includes a supporting block or anvil 52 disposed beneath the disk opposite and adjacent the cutter A. This block is rigidly mounted on a pair of upright posts 53 on the carriage B and is formed with a horizontal top face on which a plurality of transversely extending anti-friction rollers 54 are rotatably supported, for example, in half round grooves or depressions in said face. The top surfaces of the rollers are positioned to engage the bottom face of the disk X as it moves past the cutter A, said rollers acting to resist the downward thrust of the edge portion of the disk caused by the action of the cutter A.

The block or anvil 52 is preferably detachably secured to the posts 53 by screws or other fastenings 56 so that the block can be removed and replaced by others of different heights to accommodate disks or members of varying thickness.

Owing to the tendency of the edge portions of the disk or member Y on the carriage C to move upwardly under the action of the cutter A, it is desirable that the supporting and guiding means for said disk be constructed to engage the upper as well as the lower surface of said disk. There is therefore provided a supporting block 58 somewhat similar to the block 52, detachably secured by screws 59 to the upright posts 60 on the carriage C adjacent the cutter A. In this case the top horizontal face of the block 58 is positioned so that the lower surface of the edge portion of the disk bears directly thereon, while the corresponding upper face portion is engaged by a face plate 62 detachably secured to the block 58 near the opposite ends of the cutter A and outwardly beyond the edge of the disk Y. The intermediate portions of the outer edges of the blocks 58 and face plate 62 are cut away to permit the disk to engage the cutter A. By the construction described, a guide recess 63 is formed through which the edge portion of the disk Y is guided to the cutter A and is supported while the milling operation is in progress. Should the disk or member be warped or uneven, the successive portions thereof will, as they rotate, enter said guide recess and be urged into the correct operative plane relatively to said cutter. If desired, the blocks 58 and face plate 62 can be provided with anti-friction rollers, as in the case of the rollers 54 carried by the supporting block 52.

A plurality of interchangeable blocks 58 and face plates 62 forming recesses 63 of various depths are preferably provided to accommodate disks of different thickness.

In order that the milling cutter A may be supplied with lubricant while cutting, a trough or receptacle 65 is suitably mounted below said cutter and supplied with lubricant into which the cutter dips so as to apply the lubricant to the work as said cutter rotates. The trough can be supported in any suitable way, as by brackets 66 secured thereto and to the fixed uprights 16.

When forming, cutting or sharpening teeth, or otherwise operating on the disks X, Y, or other members in the machine described, burrs or roughened portions are usually produced on the edges of the teeth or other cut parts. On some classes of work, such as the steel cutting disks X and Y used for the purpose aforementioned, it is desirable to remove these burrs so as to leave the edges of the teeth, or the opposite faces of the disks or members substantially smooth.

Means are provided for this purpose, adapted to operate successively upon different peripheral portions of the work, simultaneously with, or while the cutting or sharpening action proceeds on other corresponding portions.

Such means preferably comprises a plurality of grinding wheels 70 each of which is directly driven by a small electric motor 71 on the shaft 72 of which the grinding wheel is secured.

When the machine is used for dressing the steel saws or cutting disks, such as shown, two of the grinding wheels 70 are preferably employed for each disk, one being disposed above and the other below the disk for simultaneosuly grinding off the burrs on opposite faces of the teeth or peripheral portions of the disk.

Preferably the upper and lower wheels revolve in opposite directions, thus preventing the action of the wheels on the disks from affecting the lead of the disks by the milling cutter.

Each motor 71 is mounted on brackets 73, and the brackets for each pair of motors are secured to the upper and lower faces of a horizontal plate or arm 74 of a slide 75 arranged to move on one of the rails 21 toward and from the corresponding cross carriage, whereby the wheels 70 can be positioned in correct relation to the work, see Fig. 1. The slides 75 are provided with pinions 76 mounted on rotatable stub shafts 77 on said carriages and engaging the respective racks 50, the shafts being formed to receive the crank 46 or other means for turning them. The motors 71 are each preferably adjustably mounted in their brackets 73 for movement toward and from the plate 74 to enable the grinding wheels 70 to be properly engaged with the work, and for compensating for wear and consequent reduction in diameter of said wheels. For this purpose each motor may be provided with a pair of adjusting screws 78 which are rotatably secured and prevented from endwise movement in lugs 79 on the motor, and have threaded engagement in holes in the adjacent motor brackets 73.

Suitable guide means are also provided for supporting and guiding the disks or members X and Y adjacent the grinding wheels and holding the disks in proper operative relation to the grinding wheels 70, such means being adapted, in the event that the disks are warped or bent, to force the successive peripheral portions of the disks into the correct horizontal plane as they pass between the grinding wheels, for effecting equal contact and grinding action on both faces of the disks. The means shown for this purpose comprises a plurality of anti-friction rollers or casters 80, arranged in pairs above and below the disks and adjustable toward and from the same by means of vertically adjustable studs or posts 81 on the ends of which they are swivelled. These casters 80 are disposed so as to engage the disks adjacent to and at opposite sides of the axes of the grinding wheels 70, and by appropriate adjustments of the studs 81, the casters urge or guide the successive peripheral portions of the disks into the correct plane in which these portions will enter between the grinding wheels and whereby the wheels will have equal grinding action on both faces of the disks.

The casters 80 can be adjustably supported in any suitable way, as by passing the studs 81 through vertical holes in upper and lower pairs of arms 82 of brackets 83 fixed to the plates 74 of the slides 75, and therefore movable with said slides. In this manner the casters 80 are always automatically shifted into correct relation to the edge portion of the disks when the slides are adjusted for positioning the grinding wheels 70.

I claim as my invention:—

1. In a machine for milling teeth in the edges of blanks, the combination of a rotary milling cutter having a helical thread traversed by spiral grooves to form cutting teeth, a carriage for supporting a blank with its edge engaging said cutter and having progressive movement past the same by the action of said cutter thereon, means for adjusting said carriage towards said cutter as desired as the cutting operation progresses and while said blank is moving relatively thereto, means for moving said carriage in a direction parallel with the axis of said cutter to permit different portions of the latter to operate on the blanks, and a dressing tool disposed in the path of movement of the edge of the blank so that said blank will be progressively presented thereto by the action of said cutter, said tool being adjustable in two directions at an angle to each other to permit the same to engage a face of the edge portion of said blank to remove burrs formed thereon during said milling operation.

2. In a machine for milling teeth in the edges of circular disks and the like, the combination of a rotary milling cutter having a helical thread traversed by spiral grooves to form cutting teeth, means at one side of the axis of said cutter for rotatably supporting a disk in a plane substantially parallel with said axis and with its edge in operative relation to said cutter, means at the opposite side of said cutter for similarly supporting a second disk, whereby teeth will be formed simultaneously and progressively in said respective disks by transverse movement of said cutter in one direction across the edge of one of said disks and by a similar movement in the opposite direction across the other disk, and means engaging each disk at an appropriate side thereof for resisting transverse movement of said disks in the direction of rotation of said cutter.

3. In a machine for milling teeth in the edges of circular disks and the like, the combination of a rotary milling cutter having a helical thread traversed by spiral grooves to form cutting teeth, means at one side of the axis of said cutter for rotatably supporting a disk in a plane substantially parallel with said axis and with its edge in operative relation to said cutter, means at the opposite side of said cutter for similarly supporting a second disk, whereby teeth will be formed simultaneously and progressively in said respective disks by transverse movement of said cutter in one direction across the edge of one of said disks and by a similar movement in the opposite direction across the other disk, and means adjacent said cutter at said opposite sides thereof for engaging and guiding the edge portions of said disks into alignment with the axis of said cutter and maintaining them in operative relation to said cutter as they pass thereby.

4. In a machine for milling teeth in the edges of circular disks and the like, the combination of a rotary milling cutter having a helical thread traversed by spiral grooves to form cutting teeth, a carriage mounted for transverse adjustment towards and from said cutter, and having means for rotatably supporting a disk on said carriage whereby the edge of said disk can be positioned in operative engagement with said cutter and whereby said disk will be rotated thereby and the teeth will be progressively formed on said edge during successive rotations of said disk, a movable slide, a grinding tool mounted thereon, and means for adjusting said slide towards and from said disk for positioning said tool in transverse relation to successive peripheral side portions of the edge of said rotating disk leaving said cutter, whereby burrs produced on the edges of said teeth as they are being formed by the milling operation will be progressively removed by said grinding tool as the milling operation of said cutter proceeds.

5. In a machine for milling teeth in the edges of circular disks and the like, the combination of a rotary milling cutter, having a helical thread traversed by spiral grooves to form cutting teeth, means for rotatably supporting a disk with the edge thereof in operative engagement with said cutter whereby said disk will be rotated thereby and the teeth will be progressively formed on said edge during successive rotations of said disk, a movable slide, a rotary grinding tool, means on said slide for supporting and driving said tool, means for adjusting said slide towards and from said disk in a plane parallel with the face of said disk for positioning said tool opposite and approximately in tangential relation to the successive peripheral side portions of the edge of said disk that have been operated upon by said cutter, and means for adjusting said tool supporting and driving means perpendicular to the face of said disk to engage said tool with the side edges of said teeth as they are being formed on said disk, whereby burrs produced on said teeth during the progressive formation of the teeth will be progressively removed by said grinding tool as the milling cutter continues to form the teeth on said disk edge.

6. In a machine for milling teeth in the edges of circular disks and the like, the combination of a rotary milling cutter having a helical thread traversed by spiral grooves to form cutting teeth, means for rotatably supporting a disk with the edge thereof in operative engagement with said cutter whereby said disk will be rotated thereby and the teeth will be progressively formed on said edge during successive rotations of said disk, a movable slide, a rotary grinding tool, means on said slide for supporting and driving said tool, means for adjusting said slide in one direction towards and from said disk for positioning said grinding tool opposite the successive peripheral side portions of the edge of said disk that have been operated upon by said cutter, and means for adjusting said tool supporting and driving means in another direction to engage said tool with peripheral side portions of said disk for progressively removing burrs produced on the edges of said teeth during the progressive formation thereof, guide devices adjustably supported on said slide at opposite sides of the axis of said tool for independent movement towards and into engagement with said peripheral edge portions of said disk which are moving into and out of engagement with said tool during successive rotations of said disk for guiding and holding such portions in alinement with said tool.

7. In a machine for milling teeth in the edges of circular disks and the like, the combination of a rotary milling cutter having a helical thread traversed by spiral grooves to form cutting teeth, means for rotatably supporting a disk with the edge thereof in operative engagement with said cutter whereby said disk will be rotated thereby and the teeth will be progressively formed on said edge during successive rotations of said disk rotated by said cutter, a movable slide, a rotary grinding tool and driving and supporting means therefor mounted on said slide at each side of the plane of said disk, means for adjusting said slide parallel with the plane of said disk to position said tools opposite the peripheral side edges of said disk, means for independently adjusting said tool driving and supporting means in a direction perpendicular to said disk plane, whereby said grinding tools can be engaged with the opposite faces of portions of said disk to remove burrs produced on the side edges of said teeth during the progressive formation thereof on said disk upon successive rotations thereof, and guide devices adjustably supported on said slide at opposite sides of said disk and adjacent said grinding tools for independent movement towards and into engagement with those portions of the edge of said disk which are successively moving into and out of engagement respectively with said grinding tools, whereby said disk edge will be guided between and held in correct relation to said grinding tools.

8. In a machine for forming teeth in the edges of circular disks and the like, the combination of a rotary milling cutter having a helical thread traversed by spiral grooves to form cutting teeth, means for mounting a disk for rotary movement about its axis in a position wherein its periphery is engaged and teeth formed therein by said cutter and whereby said disk is rotated by said cutter and the edge of said disk is repeatedly presented to said cutter until the formation of said teeth is completed, and a grinding tool mounted in the path of movement of said disk for engaging the side faces of the teeth as the same are moved past said tool by the action of the milling cutter during the successive rotations of said disk, whereby burrs formed on the sides of the teeth as the cutting operation proceeds are removed.

9. In a machine for forming teeth in the edges of circular disks and the like, the combination of a rotary milling cutter having a helical thread traversed by spiral grooves to form cutting teeth, means for mounting a disk for rotary movement about its axis in a position wherein its periphery is engaged and teeth formed therein by said cutter and whereby said disk is rotated by said cutter and the edge of said disk is repeatedly presented to said cutter until the formation of said teeth is completed, and grinding tools mounted at the opposite sides of said disk and positioned in the path of movement of the peripheral portion thereof as the latter leaves said cutter so as to extend across and engage the side faces of the teeth formed by said cutter and remove burrs therefrom during the successive rotations of the disk and simultaneously with the successive milling operations of said cutter on other portions of said disk.

10. In a machine for forming teeth in the edges of circular disks and the like, the combination of a rotary milling cutter having a helical thread traversed by spiral grooves to form cutting teeth, means for mounting a disk for rotary movement about its axis in a position wherein its periphery is engaged and teeth formed therein by said cutter and whereby said disk is rotated by said cutter and the edge of said disk is repeatedly presented to said cutter until the formation of said teeth is completed, and a grinding tool mounted in the path of movement of the peripheral side portions of said disk so as to engage the entire side edge of at least one tooth as the teeth are presented thereto by the disk-rotating action of the cutter during the successive rotations of said disk, whereby burrs formed on the teeth by said cutter are removed from teeth of the disk as the formation thereof proceeds and simultaneously with the milling operations of said cutter on other portions of said disk.

11. In a machine for forming teeth in the edges of circular disks and the like, the combination of a rotary milling cutter having a helical thread traversed by spiral grooves to form cutting teeth, means for mounting a disk for rotary movement about its axis in a position wherein its periphery is engaged and teeth formed therein by said cutter and whereby said disk is rotated by said cutter and the edge of each disk is repeatedly presented to said cutter until the formation of said teeth is completed, and a rotary grinding wheel mounted in the path of movement of the peripheral side portions of said disk and which extends approximately in tangential relation thereto with its cylindrical grinding edge operable on the entire side edge of at least one tooth as the teeth of said disk are presented thereto by the disk-rotating action of the cutter during the successive rotations of said disk, whereby burrs formed on the teeth by said cutter are removed from teeth of the disk as the formation thereof proceeds and simultaneously with the milling operation of said cutter on other portions of said disk.

12. In a machine for milling teeth in the edges of circular disks and the like, the combination of a support for rotatably supporting the disk for movement about its axis, means for engaging the edge of the disk to rotate the same and at the same time progressively form teeth therein during successive rotations thereof, and grinding means at one side of said first means for engaging the opposite faces of said disk at the periphery thereof and to which such part of said disk is presented by the rotative action of said first means, whereby said grinding means will progressively remove burrs as they are formed on the teeth during the successive rotations of the disk past said grinding means.

JOHN L. OSGOOD.